United States Patent [19]

Ishizaki et al.

[11] Patent Number: 5,300,467
[45] Date of Patent: Apr. 5, 1994

[54] OPTICAL GLASS

[75] Inventors: Futoshi Ishizaki; Muneo Nakahara; Hiroshi Shishido; Katsuhiko Yamaguchi, all of Sagamihara, Japan

[73] Assignee: Kabushiki Kaisha Ohara, Kanagawa, Japan

[21] Appl. No.: 996,666

[22] Filed: Dec. 24, 1992

[51] Int. Cl.$^5$ .................... C03C 3/064; C03C 3/093
[52] U.S. Cl. ........................ 501/67; 501/77; 501/79; 501/903
[58] Field of Search ............ 501/65, 67, 77, 79, 501/903

[56] References Cited

U.S. PATENT DOCUMENTS

| | | | |
|---|---|---|---|
| 4,311,504 | 1/1982 | Nigrin | 501/77 X |
| 4,390,638 | 6/1983 | Mennemann et al. | 501/903 X |
| 4,481,299 | 11/1984 | Tajima | 501/903 X |
| 4,562,162 | 12/1985 | Sagara | 501/903 X |

Primary Examiner—Karl Group
Attorney, Agent, or Firm—Hedman, Gibson & Costigan

[57] ABSTRACT

An optical glass which is a $SiO_2$—$B_2O_3$—($TiO_2$+$ZrO_2$)—SrO—BaO—$R'_2O$ system of a specific composition range exhibits optical constants of a refractive index (Nd) of 1.57–1.75 and Abbe number ($\nu d$) of 30–55, is free of PbO and has improved stability against devitrification and tinting and improved chemical durability.

11 Claims, 1 Drawing Sheet

OPTICAL GLASS

BACKGROUND OF THE INVENTION

This invention relates to an optical glass of a $SiO$—$B_2O_3$—$(TiO_2+ZrO_2)$—$SrO$—$BaO$—$R'_2O$ (where $R'$ represents an alkali metal element) system which is free of a toxic PbO ingredient, has an excellent property against devitrification, excellent light transmissivity and chemical durability and has optical constants of a refractive index (Nd) of 1.57–1.75 and Abbe number ($\nu d$) of 30–55.

As a glass having the above mentioned optical constants, there is known a silicate glass containing PbO. For coping with environmental problems arising in the process of manufacturing a glass, however, various glasses which do not contain the toxic PbO ingredient but instead contain a $TiO_2$ or $ZrO_2$ ingredient are proposed. For example, Japanese Laid-open Patent Application No. 53-16717 discloses a $SiO_2$—$TiO_2$—$ZrO_2$—$CaO$—$BaO$—$R'_2O$ system glass and Japanese Laid-open Patent Application No. 53-92816 discloses a $SiO_2$—$TiO_2$—$ZrO_2$—$(ZnO+MgO+CaO+SrO)$—$BaO$—$Li_2O$ system glass. Also, Japanese Laid-open Patent Application No. 53-90312 discloses a $SiO_2$—$B_2O_3$—$Al_2O_3$—$ZrO_2$—$ZnO$—$CaO$—$BaO$ system glass. These glasses, however, are insufficient in stability against devitrification, light transmissivity and chemical durability.

It is, therefore, an object of the invention to provide an optical glass having the above described optical constants which has overcome the above described drawbacks of the prior art optical glasses.

SUMMARY OF THE INVENTION

Accumulated studies and experiments made by the inventors of the present invention for achieving the above described object of the invention have resulted in a finding, which has led to the present invention, that a desired glass which, while maintaining the above described optical constants, is remarkably improved in the property against devitrification and has excellent light transmissivity and chemical durability can be obtained in a novel $SiO_2$—$B_2O_3$—$(TiO_2+ZrO_2)$—$SrO$—$BaO$—$R'_2O$ system glass of a specific content range.

The optical glass achieving the above described object of the invention is characterized in that the glass consists essentially of in weight percent:

|  |  |  |
|---|---|---|
|  | $SiO_2$ | 20–50% |
|  | $B_2O_3 + Al_2O_3$ | 8–14% |
| in which | $B_2O_3$ | 8–14% |
|  | $Al_2O_3$ | 0–6% |
|  | $TiO_2 + ZrO_2$ | 5–20% |
| in which | $TiO_2$ | 0.5–15% |
|  | $ZrO_2$ | 0.5–8% |
|  | $MgO + CaO + SrO + BaO$ | 25–53% |
| in which | $MgO$ | 0–4% |
|  | $CaO$ | 0–15% |
|  | $SrO$ | 0.5–20% |
|  | $BaO$ | 15–45% |
|  | $ZnO$ | 0–15% |
|  | $Li_2O + Na_2O + K_2O$ | 0.1–10% | and having a refractive index (Nd) of 1.57–1.75 and Abbe number ($\nu d$) of 30–55.

DETAILED DESCRIPTION OF THE INVENTION

In the optical glass made according to the invention, the above described content ranges of the respective ingredients have been selected for the reasons stated below. In the following description, the content ranges of the respective ingredients are expressed in weight percent.

The $SiO_2$ ingredient is indispensable as a glass forming oxide. If the amount of this ingredient is below 20%, light transmissivity and chemical durability of the glass are deteriorated. If the amount exceeds to 50%, difficulty arises in melting of the glass. The $B_2O_3$ ingredient is useful for improving the melting property and stability of the glass. If the amount is below 8%, the expected effect cannot be obtained whereas if the amount exceeds 14%, chemical durability of the glass is deteriorated. The $Al_2O_3$ ingredient may be added because it is useful for improving the stability against devitrification and chemical durability of the glass. If, however, the amount exceeds 6%, the stability against devitrification is deteriorated rather than improved. If the total amount of one or both of the $B_2O_3$ and $Al_2O_3$ ingredients is below 8%, the melting property and stability of the glass are deteriorated whereas if the total amount exceeds 14%, the stability against devitrification is deteriorated.

The $TiO_2$ ingredient is effective for imparting the glass with a high refractive index. If the amount of this ingredient is below 0.5%, the expected property cannot be sufficiently obtained whereas if the amount exceeds 15%, light transmissivity and chemical durability of the glass are deteriorated. The $ZrO_2$ ingredient is effective for improving chemical durability of the glass and imparting the glass with a high refractive index. If the amount is below 0.5%, the expected property cannot be sufficiently obtained whereas if the amount exceeds 8%, the stability against devitrification is deteriorated. The total amount of one or both of the $TiO_2$ and $ZrO_2$ ingredients should be within a range of 5–20% for obtaining the desired refractive index while maintaining the stability against devitrification.

The MgO and CaO ingredients are useful for adjusting optical constants and therefore may be added optionally. If the amounts of the respective ingredients exceed 4% and 15%, the glass tends to become instable. The SrO ingredient is an important ingredient in the glass of the present invention for improving the stability against devitrification and chemical durability while maintaining the desired optical constants. If the amount is below 0.5%, the expected effect cannot be obtained sufficiently whereas if the amount exceeds 20%, the stability against devitrification is deteriorated rather than improved.

Figure 1:
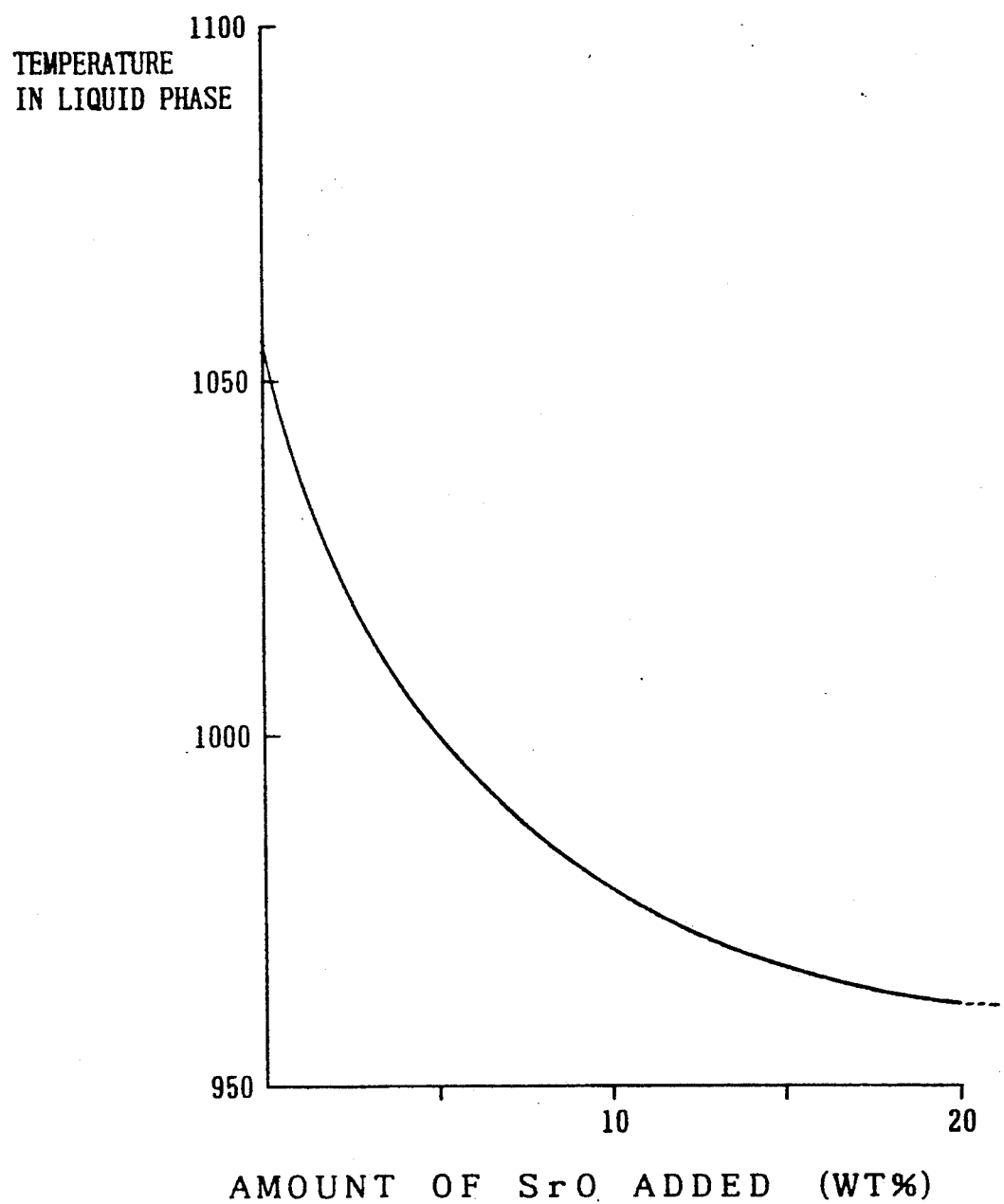
FIG. 1 shows an effect on stability against devitrification obtained by addition of SrO to the $SiO_2$—$B_2O_3$—$(TiO_2+ZrO_2)$—$BaO$—$R'_2O$ (where $R'$ is an alkali metal element) system glass.

The BaO ingredient is useful for imparting the glass with the desired optical constants and the stability against devitrification. If the amount is below 15%, the expected property cannot be obtained sufficiently whereas if the amount exceeds 45%, chemical durability is deteriorated. The total amount of the MgO, CaO, SrO and BaO ingredients should be within a range of 25-53% for imparting the glass with the desired optical constants and the stability against devitrification without deteriorating chemical durability of the glass. The ZnO ingredient may be added because it is useful for improving the stability against devitrification and adjusting optical constants. If the amount exceeds 15%, the stability against devitrification is deteriorated rather than improved.

The $Li_2O$, $Na_2O$ and $K_2O$ ingredients are effective for improving the melting property and stability of the glass. If the total amount of one or more of these ingredients is below 0.1%, the expected effect cannot be obtained sufficiently whereas if the amount exceeds 10%, chemical durability of the glass is deteriorated. Known defoaming and refining agents such as $As_2O_3$ and $Sb_2O_3$ may be added up to about 1% respectively.

The optical glass according to the invention comprises the above described ingredients and have the above described optical constants. If, in carrying out the present invention, it is desired to obtain a glass having optical constants of a refractive index (Nd) of 1.60–1.75 and Abbe number ($\nu d$) of 30–50, the content ranges of the $SiO_2$, $Al_2O_3$ and $TiO_2$ ingredients should preferably be restricted to 20–40%, 0.5–6% and 7–15% respectively for further improving the stability of the glass. Likewise, if it is desired to obtain a glass having optical constants of a refractive index (Nd) of 1.57–1.68 and Abbe number ($\nu d$) of 45–55, the content ranges of the $B_2O_3$, $TiO_2$ and $ZrO_2$ should preferably be restricted to 8–10%, 0.5–6% and 0.5–5% respectively for further improving the stability of the glass.

EXAMPLES

Examples of the optical glass according to the invention will be described below.

Table 1 shows examples of preferred compositions (No. 1–No. 10) of the optical glass made according to the invention in a case of obtaining optical constants of a refractive index (Nd) of 1.60–1.75 and Abbe number ($\nu d$) of 30–50 and comparative examples (No. A and No. B) of the prior art optical glass as well as results of measurement of refractive index (Nd), Abbe number ($\nu d$), temperature in liquid phase (°C.) and wavelengths ($T_{80}$ (nm)) of light producing light transmissivity of 80% in a specimen with two polished surfaces having thickness of 10 mm of these glasses. The temperature in liquid phase was obtained by placing a broken piece of each glass on a hole formed in a platinum plate, melting it in a temperature gradient furnace, holding it for 30 minutes and thereafter taking it out of the furnace and observing the state of growth of crystal by a microscope.

Table 2 shows examples of preferred compositions (No. 1–No. 6) in a case of obtaining a glass having optical constants of a refractive index (Nd) of 1.57–1.68 and Abbe number ($\nu d$) of 45–55 and a comparative example (No. A) as well as results of measurement of refractive index (Nd), Abbe number ($\nu d$), temperature in liquid phase (°C.) and an acid-proof test of these glasses. The result of the acid-proof test was obtained by soaking a mass of glass having a broken surface in 1N nitric acid solution (20° C.) for 1 hour and observing the state of corrosion of the broken surface of the glass. In this test, a glass which has not produced any change is marked by a circle and a glass which has produced change by corrosion of the surface is marked by a cross.

The glasses of the respective compositions in Tables 1 and 2 were obtained by measuring and mixing raw materials of optical glasses and melting the mixture of the raw materials in a platinum crucible, stirring the mixture to homogenize it, casting it in a mold into a block and then annealing it.

As shown in Table 1, the glasses of the examples of the present invention have optical constants similar to those of the glasses of the comparative examples but have a lower temperature of liquid phase than the comparative examples which indicates that the stability against devitrification of the glasses of these examples is significantly improved over the comparative examples. It is also observed that the values of $T_{80}$ of the glasses of the examples of the invention are shifted to the short wavelength side which indicates that these glasses are excellent in the property against tinting.

Further, as shown in Table 2, the glasses of the other examles of the invention have optical constants similar to those of the comparative example but have a lower temperature in liquid phase than the comparative example which indicates that the glasses of these examples are further stable and also more excellent in the acid proof property.

As described in the foregoing, the optical glass according to the invention which is a $SiO_2$—$B_2O_3$—($TiO_2+ZrO_2$)—SrO—BaO—$R'_2O$ system glass and has optical constants of a refractive index (Nd) of 1.57–1.75 and Abbe number ($\nu d$) of 30–55 has a significantly improved stability against devitrification over the prior art optical glasses and, therefore, efficiency of production of the optical glass is improved. The optical glass according to the invention is also excellent in chemical durability and the property against tinting.

TABLE 1

| | (in weight %) | | | | | |
|---|---|---|---|---|---|---|
| | Examples | | | | | |
| No. | 1 | 2 | 3 | 4 | 5 | 6 |
| $SiO_2$ | 28.0 | 29.0 | 31.0 | 25.0 | 27.5 | 25.0 |
| $B_2O_3$ | 11.0 | 8.0 | 9.0 | 8.0 | 8.0 | 8.0 |
| $Al_2O_3$ | 3.0 | 2.0 | 1.5 | 3.0 | 2.0 | 2.5 |
| $TiO_2$ | 9.5 | 8.5 | 12.0 | 10.0 | 10.0 | 12.5 |
| $ZrO_2$ | 5.0 | 3.0 | 2.3 | 4.0 | 3.0 | 2.5 |
| MgO | | | | | | |
| CaO | | 5.0 | | 2.5 | | |
| SrO | 2.8 | 12.3 | 10.0 | 10.0 | 1.0 | 12.5 |
| BaO | 36.5 | 25.0 | 25.0 | 25.0 | 42.0 | 29.4 |
| ZnO | 3.5 | 5.0 | 7.0 | 10.0 | 5.0 | 5.0 |
| $Li_2O$ | 0.5 | 2.0 | 2.0 | 2.3 | 1.3 | 2.5 |
| $Na_2O$ | | | | | | |
| $K_2O$ | | | | | | |
| $Sb_2O_3$ | 0.2 | 0.2 | 0.2 | 0.2 | 0.2 | 1.0 |
| Nd | 1.6938 | 1.6980 | 1.7012 | 1.7120 | 1.70820 | 1.7290 |
| $\nu d$ | 40.5 | 41.6 | 39.5 | 39.5 | 39.9 | 38.9 |

TABLE 1-continued (in weight %)

| | | | | | | |
|---|---|---|---|---|---|---|
| temperature in liquid phase (°C.) | 1028 | 970 | 978 | 983 | 1035 | 973 |
| T₈₀ (nm) | 398 | 402 | 405 | 402 | 400 | 405 |

| | Examples | | | | Comparative Examples | |
|---|---|---|---|---|---|---|
| No. | 7 | 8 | 9 | 10 | A | B |
| $SiO_2$ | 38.0 | 30.5 | 25.0 | 27.0 | 38.6 | 34.0 |
| $B_2O_3$ | 9.0 | 10.0 | 8.5 | 11.0 | 3.0 | |
| $Al_2O_3$ | 0.5 | 2.5 | 5.0 | 3.0 | | 1.5 |
| $TiO_2$ | 10.0 | 7.5 | 9.0 | 9.5 | 9.8 | 14.0 |
| $ZrO_2$ | 2.5 | 2.5 | 5.0 | 5.0 | 5.0 | 3.5 |
| MgO | | | | 3.5 | | |
| CaO | | 2.3 | 2.5 | | 12.7 | 15.0 |
| SrO | 5.0 | 5.0 | 2.5 | 10.0 | | |
| BaO | 30.0 | 29.5 | 35.0 | 30.0 | 22.1 | 30.0 |
| ZnO | 3.0 | 5.0 | 5.0 | | 3.8 | |
| $Li_2O$ | | | 1.3 | 0.9 | 2.0 | |
| $Na_2O$ | 1.8 | | 1.0 | | 2.0 | |
| $K_2O$ | | 5.0 | | | 1.0 | 2.0 |
| $Sb_2O_3$ | 0.2 | 0.2 | 0.2 | 0.1 | | |
| Nd | 1.6664 | 1.6733 | 1.6914 | 1.6919 | 1.6891 | 1.7238 |
| νd | 42.6 | 42.2 | 41.2 | 41.2 | 41.6 | 37.5 |
| temperature in liquid phase (°C.) | 995 | 1008 | 1020 | 970 | 1080 | 1102 |
| T₈₀ (nm) | 397 | 401 | 403 | 402 | 410 | 412 |

TABLE 2

(in weight %)

| | Examples | | | | | | Comparative Example |
|---|---|---|---|---|---|---|---|
| No. | 1 | 2 | 3 | 4 | 5 | 6 | A |
| $SiO_2$ | 34.0 | 42.0 | 50.0 | 33.0 | 43.5 | 31.0 | 27.0 |
| $B_2O_3$ | 9.5 | 8.0 | 8.0 | 8.5 | 9.5 | 8.5 | 10.0 |
| $Al_2O_3$ | 1.0 | | | 2.0 | | 2.0 | 5.0 |
| $TiO_2$ | 3.0 | 6.0 | 4.5 | 3.5 | 4.5 | 3.5 | 3.7 |
| $ZrO_2$ | 4.5 | 1.0 | 1.5 | 4.5 | 1.5 | 1.5 | 3.0 |
| MgO | | | | | | 4.0 | |
| CaO | 14.0 | 5.5 | | 5.0 | 4.9 | 6.5 | 6.0 |
| SrO | 7.0 | 1.0 | 10.3 | 15.0 | 2.0 | 8.5 | |
| BaO | 26.3 | 20.0 | 20.5 | 23.0 | 26.0 | 34.0 | 39.0 |
| ZnO | | 6.5 | | 5.0 | | | 5.8 |
| $Li_2O$ | 0.4 | | | 0.3 | | 0.3 | |
| $Na_2O$ | | 5.0 | 2.0 | | | | |
| $K_2O$ | | 5.0 | 3.0 | | 8.0 | | |
| $Sb_2O_3$ | 0.3 | | 0.2 | 0.2 | 0.1 | 0.2 | 0.2 |
| $As_2O_3$ | | | | | | | 0.3 |
| Nd | 1.6575 | 1.6137 | 1.5896 | 1.6624 | 1.6036 | 1.6613 | 1.6635 |
| νd | 48.1 | 49.2 | 52.7 | 48.4 | 51.4 | 49.0 | 48.6 |
| temperature in liquid phase (°C.) | 980 | 1030 | 980 | 965 | 1025 | 985 | 1055 |
| acid-proof test | ○ | ○ | ○ | ○ | ○ | ○ | X |

What is claimed is:

1. An optical glass which consists essentially of in weight percent:

| | | |
|---|---|---|
| | $SiO_2$ | 20–50% |
| | $B_2O_3 + Al_2O_3$ | 8–14% |
| in which | $B_2O_3$ | 8–14% |
| | $Al_2O_3$ | 0–6% |
| | $TiO_2 + ZrO_2$ | 5–20% |
| in which | $TiO_2$ | 0.5–15% |
| | $ZrO_2$ | 0.5–8% |
| | MgO + CaO + SrO + BaO | 25–53% |
| in which | MgO | 0–4% |
| | CaO | 0–15% |
| | SrO | 0.5–20% |
| | BaO | 15–45% |
| | ZnO | 0–15% |
| | $Li_2O + Na_2O + K_2O$ | 0.1–10% | and having a refractive index (Nd) of 1.57–1.75 and Abbe number (νd) of 30–55.

2. An optical glass as defined in claim 1 wherein the amount of $SiO_2$ is 20–40%, the amount of $Al_2O_3$ is 0.5–6% and the amount of $TiO_2$ is 7–15% and which has a refractive index (Nd) of 1.60–1.75 and Abbe number (νd) of 30–50.

3. An optical glass as defined in claim 1 wherein the amount of $B_2O_3$ is 8–10%, the amount of $TiO_2$ is 0.5–6% and the amount of $ZrO_2$ is 0.5–5% and which has a refractive index (Nd) of 1.57–1.68 and Abbe number (νd) of 45–55.

4. An optical glass which consists essentially of in weight percent:

| | | |
|---|---|---|
| $SiO_2$ | | 20–50% |
| $B_2O_3 + Al_2O_3$ | | 8–14% |
| in which $B_2O_3$ | | 8–14% |

-continued

|  |  |
|---|---|
| $Al_2O_3$ | 0–6% |
| $TiO_2 + ZrO_2$ | 5–20% |
| in which $TiO_2$ | 0.5–15% |
| $ZrO_2$ | 0.5–5% |
| $MgO + CaO + SrO + BaO$ | 25–53% |
| in which MgO | 0–4% |
| CaO | 0–15% |
| SrO | 0.5–20% |
| BaO | 15–45% |
| ZnO | 0–15% |
| $Li_2O + Na_2O + K_2O$ | 0.1–10% | and having a refractive index (Nd) of 1.57–1.75 and an Abbe number (νd) of 30–55.

5. An optical glass which consists essentially of in weight percent:

|  |  |
|---|---|
| $SiO_2$ | 20–50% |
| $B_2O_3 + Al_2O_3$ | 8–14% |
| in which $B_2O_3$ | 8–10% |
| $Al_2O_3$ | 0–6% |
| $TiO_2 + ZrO_2$ | 5–11% |
| in which $TiO_2$ | 0.5–6% |
| $ZrO_2$ | 0.5–5% |
| $MgO + CaO + SrO + BaO$ | 25–53% |
| in which MgO | 0–4% |
| CaO | 0–15% |
| SrO | 0.5–20% |
| BaO | 15–45% |
| ZnO | 0–15% |
| $Li_2O + Na_2O + K_2O$ | 0.1–10% | and having a refractive index (Nd) of 1.57–1.68 and an Abbe number (νd) of 30–55.

6. An optical glass which consists essentially of in weight percent:

|  |  |
|---|---|
| $SiO_2$ | 20–40% |
| $B_2O_3 + Al_2O_3$ | 8–14% |
| in which $B_2O_3$ | 8–10% |
| $Al_2O_3$ | 0.5–6% |
| $TiO_2 + ZrO_2$ | 5–20% |
| in which $TiO_2$ | 7–15% |
| $ZrO_2$ | 0.5–8% |
| $MgO + CaO + SrO + BaO$ | 25–53% |
| in which MgO | 0–4% |
| CaO | 0–15% |
| SrO | 0.5–20% |
| BaO | 15–45% |
| ZnO | 0–15% |
| $Li_2O + Na_2O + K_2O$ | 0.1–10% | and having a refractive index (Nd) of 1.60–1.75 and an Abbe number (νd) of 30–55.

7. An optical glass as defined in claim 1 wherein the BaO component is present at a level of 20 weight percent.

8. An optical glass as defined in claim 1 wherein the $Zr_2O$ component is present at a level of 2.5 weight percent.

9. An optical glass is defined in claim 1 wherein the $B_2O_3$ component is present at a level of 9.5 weight percent.

10. An optical glass as defined in claim 1 wherein the SrO component is present at a level of 2.8 weight percent.

11. A method of making an optical glass composition which comprises:

(a) mixing and melting the following ingredients:

|  |  |  |
|---|---|---|
|  | $SiO_2$ | 20–50% |
|  | $B_2O_3 + Al_2O_3$ | 8–14% |
| in which | $B_2O_3$ | 8–14% |
|  | $Al_2O_3$ | 0–6% |
|  | $TiO_2 + ZrO_2$ | 5–20% |
| in which | $TiO_2$ | 0.5–15% |
|  | $ZrO_2$ | 0.5–8% |
|  | $MgO + CaO + SrO + BaO$ | 25–53% |
| in which | MgO | 0–4% |
|  | CaO | 0–15% |
|  | SrO | 0.5–20% |
|  | BaO | 15–45% |
|  | ZnO | 0–15% |
|  | $Li_2O + Na_2O + K_2O$ | 0.1–10% | and thereafter stirring the mixture to homogenize it, casting said mixture into a mold to form a block and thereafter annealing said block.

* * * * *